United States Patent Office 3,776,895
Patented Dec. 4, 1973

3,776,895
PRODUCTION OF CYCLOALKENE POLYMERS HAVING IMPROVED PROCESSABILITY
Servaas van der Ven and Dirk Medema, Amsterdam, Netherlands, assignors to Shell Oil Company, New York, N.Y.
No Drawing. Filed Sept. 14, 1970, Ser. No. 72,167
Claims priority, application Netherlands, Sept. 24, 1969, 6914466
Int. Cl. C08f 1/56
U.S. Cl. 260—93.1    5 Claims

ABSTRACT OF THE DISCLOSURE

Elastomeric cycloalkene polymers having improved processability are produced by polymerizing at least one cycloalkene having 5 or 7 to 12 ring carbon atoms with a catalyst system consisting of a combination of an aluminum hydrocarbyl compound and a compound of tungsten or molybdenum and in the presence of a small amount of an acyclic monoolefin.

---

This invention relates to a process for the polymerization of at least one cycloalkene having 5 or 7 to 12 ring carbon atoms to elastomeric polymers which display improved processability owing to the fact that they have reduced average molecular weight.

It is known that cycloalkenes may be polymerized to high molecular weight in the presence of a catalyst system consisting of a tungsten halide and an organometallic or metal hydride compound of a metal from Groups I, II or III of the Periodic Table of Elements.

Further, it is known that processable cycloalkene polymers having a lower molecular weight may be prepared by copolymerizing said cycloalkenes with conjugated dienes, which, however, give rise to undesirable cross-linking, especially at high cycloalkene conversion.

Additionally, it is known that when cycloolefins such as cyclooctene are polymerized in the presence of a catalyst mixture of tungsten hexachloride, ethyl alcohol and ethyl aluminum dichloride, the presence of acyclic vinylidene compounds results in olefin metathesis between macrocyclic species and the acyclic vinylenic compound, producing an open-chain polymer whose end groups are the alkylidene moieties of the acyclic vinylenic compound.

It has now been found that elastomeric cycloalkene polymers having improved processability can be prepared by a process comprising contacting at least one cycloalkene from the group consisting of cyclopentene and cycloalkenes having 7 to 12 carbon atoms in the ring with a combination catalyst consisting essentially of (1) an aluminum hydrocarbyl compound and (2) a compound of tungsten or molybdenum in the presence of an acyclicalkene in an amount of from 0.0001 to 5 mole percent, calculated on cycloalkene. The term "cycloalkene polymers" refers not only to homopolymers, but also to copolymers of two or more cycloalkenes from the group consisting of cyclopentene and cycloalkenes having 7 to 12 ring carbon atoms.

The cycloalkenes suitably employed in the process of the invention are those in which the number of ring carbon atoms amounts to $6+x$, wherein $x$ represents any negative or positive whole number from $-1$ to $+6$. Since the invention does not relate to the polymerization of cyclohexene, which—probably owing to the great stability of its ring—cannot, in the way described, be polymerized to products with a sufficiently high molecular weight, $x$ may not have the value zero. Eligible monomers include cyclopentene, cycloheptene, cyclooctene and cyclododecene; however, most preference is given to the preparation of polymers of cyclopentene, because of its availability.

The acyclic alkenes that are most suitable are those in which the two carbon atoms that are linked by the double bond carry only one hydrogen atom each. Preferred are acyclic alkenes having an average carbon number of about 5, i.e., from about 4 to about 7 carbon atoms. Especially preferred is cis-pentene-2. The amount of acyclic alkene employed in the process according to the invention is preferably below about 2 mole percent, and more preferably from about 0.01 to 1 mole percent.

The polymerization can most suitably be effected in a homogeneous medium, preferably under conditions at which the monomer concentration is as high as possible, for instance, by applying only very small, if any quantities of diluent. However, larger quantities of diluent may be employed. Representative examples of diluents are liquid aromatic hydrocarbons, such as benzene and toluene; hydrogenated aromatic hydrocarbons, such as Tetralin; liquid aliphatic hydrocarbons, such as pentane, hexane, petroleum ether and decane; and cycloaliphatic hydrocarbons, such as cyclohexane, Decalin and cyclooctane.

The polymerization catalyst system employed in the process according to the invention consists essentially of a combination of an aluminum hydrocarbyl compound and a compound of tungsten or of molybdenum, a combination of an aluminum alkyl and a tungsten halide being preferred.

Examples of suitable aluminum alkyl halides are aluminum monoalkyl dichloride, aluminum dialkyl monochloride and aluminum alkyl sesquichloride. Instead of the chlorides, other halides, for instance the bromides, can be used as well. The alkyl group can also be replaced by a cycloalkyl or an aryl group. Instead of the aluminum hydrocarbyl halides, aluminum hydrocarbyl hydrides or aluminum trihydrocarbyl compounds may be applied as catalyst components. The hydrocarbyl groups may contain up to about 16, preferably up to about 12, carbon atoms each. Exemplary hydrocarbyl groups are methyl, ethyl, butyl, cyclohexyl, cyclooctyl, phenyl, xylyl, decyl and lauryl.

The tungsten or molybdenum compounds are preferably salts of inorganic or organic acids. Halides are particularly effective. Examples of suitable tungsten halides are $WCl_6$, $WBr_6$, $WI_6$, $WF_6$, $WOCl_4$, $WO_2Cl_2$, $WCl_5$, $WBr_5$, $WO_2Br_2$, $WCl_4$, $WCl_2$, $W_2Cl_6$ (pyridine)$_3$ and the $3WCl_2 \cdot 4AlCl_3$ complex. Halides of molybdenum combined with an aluminum hydrocarbyl compound, too, may constitute a suitable catalyst system. Examples of such halides are $MoCl_5$, $MoF_5$, $MoCl_2$ (phenoxide)$_3$, $MoF_5Cl$.

Other compounds of tungsten or of molybdenum may be applied as catalyst component, such as phenolates, acetylacetonates, acetates, benzoates, sulphates, phosphates and nitrates. As examples of representatives of the phenolates and acetylacetonates may be mentioned $W(\text{phenoxide})_6$ and $MoO_2(\text{acetylacetonate})_2$.

Although there are no limits to the ratio of the quantity of tungsten or molybdenum compound to the quantity of aluminum compound, preferably molar ratios between 1:0.1 and 1:100, in particular between 1:0.5 and 1:20, are applied. Neither is the molar ratio of the tungsten or molybdenum compound to the cycloalkene subject to certain limits, but usually it is between 1:10 and 1:100,000. Preferably, this ratio is smaller that 1:5000, more preference being given to ratios smaller than 1:100,000. Preferably, this ratio is smaller than 1:5000, and 1:50,000.

In general, the polymerization temperature may vary between wide limits, for instance, from $-80°$ C. to $+150°$ C.; temperatures between $-20°$ C. and $+80°$ C. are preferred. As a rule, the pressure applied is the autogenous pressure, developed by the reaction components under the prevailing reaction conditions. The polymerization may, however, also be carried out at higher or lower pressures.

The properties of the polymers obtained, such as the content of double bonds with either a cis or a trans configuration, are partly dependent on the catalyst components selected.

If desired, the catalyst system can be modified by adding one or more other components, such as oxygen or one or more compounds belonging to the group of water, $H_2O_2$, $H_2S$, saturated or unsaturated alcohols, mercaptans, organic peroxides or hydroperoxides, hydrodisulphides, polyalcohols, polymercaptans, hydroxymercaptans or thioalcohols.

If the polymerization is effected in the same way but in the absence of an acyclic alkene, polymers with a considerably higher average molecular weight are obtained. This causes these products to be less easily processable, and particularly if during the polymerization the applied quantity of tungsten or molybdenum compound is small with respect to the quantity of monomer, these products are even difficult, or very difficult, to process.

The polymers obtained according to the invention are synthetic rubbers which display improved processability owing to the fact that they have reduced average molecular weight. They can be readily processed by, e.g., mill blending, Banbury mixing, calendering, extrusion, and the like, without requiring processing aids. They can be processed with conventional rubber additives such as extending oil, fillers, pigments, antioxidants, vulcanizing agents, and the like, to vulcanized articles.

The invention will be elucidated with the aid of the following examples.

EXAMPLE I

In a reactor filled with dry nitrogen, 100 millimoles of cyclopentene were polymerized at 0° C. for 2 hours in 15 ml. toluene in which 0.01 millimole of tungsten hexachloride and 0.0108 millimole of aluminum ethyl sesquichloride (AlEt1½Cl1½) has been dissolved. The polymerization was stopped by adding 5 ml. methanol, containing 2 g./l 1,3,5 - trimethyl - 2,4,6 - tri(3,5-di-tert-butyl - 4 - hydroxybenzyl)benzene as antioxidant. Subsequently, the reaction mixture was stirred into a mixture of 400 ml. methanol and 10 ml. of a solution of 35% w. HCl in water. After the polymer had been isolated, dried and weighed, the degree of conversion was calculated; the intrinsic viscosity (IV), which correlates directly with molecular weight, of the polymer was determined in toluene at 30° C. and its percentage of trans double bonds per monomer unit was established with the aid of infrared analysis.

The experiment (No. 1), which served as a "blank" for comparison, was repeated several times, with this difference that the polymerization was now effected according to the invention in the presence of various quantities of cis-pentene-2. These quantities and the results have been summarized in Table A below.

TABLE A

| Experiment number | Quantity of cis-pentene-2, percent m.ᵃ | Conversion, percent | IV, dl./g. | Trans double bonds, percent m.ᵃ |
|---|---|---|---|---|
| 1 (blank) | | 75.2 | 9.6 | 73.0 |
| 2 | 0.01 | 69.7 | 8.3 | 73.1 |
| 3 | 0.05 | 77.5 | 2.9 | 73.3 |
| 4 | 0.065 | 70.6 | 2.5 | 72.3 |
| 5 | 0.08 | 69.4 | 2.2 | 72.6 |
| 6 | 0.10 | 76.5 | 1.6 | 72.8 |
| 7 | 0.15 | 74.0 | 1.3 | 72.8 |

ᵃ On cyclopentene.

EXAMPLE II

The experiments described in Example I were repeated, except that the 0.0108 mmole of aluminum sesquichloride was replaced with 0.018 mmole ethyl aluminum dichloride, EtAlCl₂. Experiment No. 8 (blank) served for comparison. The quantity of cis-pentene-2 in the presence of which the polymerization was effected is shown in Table B, which gives the results.

TABLE B

| Experiment No. | Quantity of cis-pentene-2, percent m.ᵃ | Conversion, percent | IV, dl./g. |
|---|---|---|---|
| 8 (blank) | | 31 | 14 |
| 9 | 0.06 | 21 | 6.5 |
| 10 | 0.125 | 22 | 4.5 |
| 11 | 0.25 | 20 | 3.0 |

ᵃ On cyclopentene.

EXAMPLE III

Experiment No. 5 of Example I was repeated except that the quantities applied were 10 times as large. The degree of conversion was 70%, the IV of the polymer was 2.1 dl./g. and the percentage of trans double bonds in the polymer was found to be 73.0% m. (on cyclopentene).

From the easily processable polymer thus obtained, two compositions, A and B, were prepared according to the following receipe, expressed in parts by weight.

Composition A:
```
polymer _____ 100
HAF black _____  50
sulphur _____ 2.25
N - cyclohexyl - 2 - benzothiazole sulphene
  amide _____ 0.9
stearic acid _____ 3.0
ZnO _____ 5.0
phenyl-beta-naphthylamine _____ 1.0
extender oil _____ 5.0
```
Composition B:
```
polymer _____  80
extender oil _____  20
HAF black _____  50
sulphur _____ 2.0
N - cyclohexyl - 2 - benzothiazole sulphene
  amide _____ 0.8
stearic acid _____ 3.0
ZnO _____ 5.0
phenyl-beta-naphthylamine _____ 1.0
```

From the two compositions, sheets of 1.5 mm. thickness were prepared by milling at 60–70° C.; these sheets were subsequently vulcanized in a press at 145° C., composition A for 25 minutes, composition B for 28 minutes. From the vulcanizates thus obtained, the "Shore A" hardness and the tensile properties (ASTM–D 412–68, Die C) were determined. The results have been summarized in Table C.

TABLE C

| Composition | Tensile strength, kg./cm.² | Elongation at rupture, percent | Permanent, percent | Modulus, kg./cm.² 200% | Modulus, kg./cm.² 300% | Shore A hardness |
|---|---|---|---|---|---|---|
| A | 182 | 315 | 1.3 | 106 |  | 72 |
| B | 165 | 347 | 0.9 |  | 130 | 67 |

We claim as our invention:

1. A process for the preparation of cycloalkene polymers having improved processability comprising: contacting at least one cycloalkene from the group consisting of cyclopentene and cycloalkenes having 7 to 12 carbon atoms in the ring with a combination catalyst consisting essentially of (1) an aluminum hydrocarbyl compound selected from aluminum hydrocarbyl halides, aluminum hydrocarbyl hydrides and aluminum trihydrocarbyl compounds wherein the hydrocarbyl groups containing up to 16 carbon atoms and (2) a compound of tungsten or molybdenum selected from halides, phenolates, acetylacetonates, acetates, benzoates, sulphates, phosphates and nitrates in the presence of acyclic alkene of from 4 to 7 carbon atoms and in which the two carbon atoms that are linked by the double bond carry only one hydrogen each; in an amount of from 0.001 to 5 mole percent, calculated on cycloalkene.

2. A process as in claim 1 wherein the amount of acyclic alkene is in the range from about 0.01 to about 1 mol percent.

3. A process as in claim 1 wherein the acylic alkene is cis-pentene-2.

4. A process as in claim 1 wherein the cycloalkene to be polymerized is cyclopentene.

5. A process as in claim 1 wherein the catalyst component (1) is an aluminum alkyl halide and catalyst component (2) is a tungsten halide.

References Cited
UNITED STATES PATENTS

| | | | |
|---|---|---|---|
| 3,074,918 | 1/1963 | Eleuterio | 260—93.1 |
| 3,449,310 | 6/1969 | Dall'Asta et al. | 260—93.1 |
| 3,458,489 | 7/1969 | Natta et al. | 260—93.1 |
| 3,459,725 | 8/1969 | Natta et al. | 260—93.1 |
| 3,476,728 | 11/1969 | Natta et al. | 260—93.1 |
| 3,502,626 | 3/1970 | Dall'Asta et al. | 260—80.78 |
| 3,549,607 | 12/1970 | Natta et al. | 260—93.1 |
| 3,577,400 | 5/1971 | Judy | 260—88.2 |
| 3,684,781 | 8/1972 | Nützel et al. | 260—80.78 |
| 3,707,520 | 12/1972 | Pampus et al. | 260—33.6 AQ |

JOSEPH L. SCHOFER, Primary Examiner

S. M. LEVIN, Assistant Examiner

U.S. Cl. X.R.

260—23 R, 80.78, 88.2 F, 88.2 B